US012802249B2

(12) United States Patent
Berman et al.

(10) Patent No.: US 12,802,249 B2
(45) Date of Patent: Nov. 17, 2026

(54) SYSTEM AND METHOD FOR DEFINING A VIRTUAL DATA CAPTURE POINT

(71) Applicant: INTERAPTIX INC., Toronto (CA)

(72) Inventors: Isaac Louis Gold Berman, Toronto (CA); Parya Jafari, Toronto (CA); Dae Hyun Lee, Etobicoke (CA); Bardia Bina, Toronto (CA)

(73) Assignee: INTERAPTIX INC., Toronto (CA)

( * ) Notice: Subject to any disclaimer, the term of this patent is extended or adjusted under 35 U.S.C. 154(b) by 226 days.

(21) Appl. No.: 18/740,938

(22) Filed: Jun. 12, 2024

(65) Prior Publication Data

US 2024/0331177 A1 Oct. 3, 2024

Related U.S. Application Data

(63) Continuation of application No. PCT/IB2022/062136, filed on Dec. 13, 2022.

(60) Provisional application No. 63/288,834, filed on Dec. 13, 2021.

(51) Int. Cl.

| | |
|---|---|
| ***G06T 7/50*** | (2017.01) |
| ***G06T 7/12*** | (2017.01) |
| ***G06T 7/20*** | (2017.01) |
| ***G06V 20/40*** | (2022.01) |

(52) U.S. Cl.
CPC .................. *G06T 7/50* (2017.01); *G06T 7/12* (2017.01); *G06T 7/20* (2013.01); *G06V 20/49* (2022.01); *G06T 2207/20192* (2013.01); *G06V 2201/07* (2022.01)

(58) Field of Classification Search
CPC .... G06T 7/50; G06T 7/12; G06T 7/20; G06T 2207/20192; G06V 20/49; G06V 2201/07; G06V 20/40; H04N 21/21805; H04N 21/44029; H04N 21/4728; H04N 21/816
See application file for complete search history.

(56) References Cited

U.S. PATENT DOCUMENTS

| | | | | |
|---|---|---|---|---|
| 5,745,126 A | | 4/1998 | Jain et al. | |
| 6,266,068 B1 | * | 7/2001 | Kang | G06T 11/60 345/422 |
| 7,286,143 B2 | * | 10/2007 | Kang | G06T 7/557 345/428 |
| 11,216,663 B1 | * | 1/2022 | Ettinger | G05D 1/0016 |
| 2022/0224833 A1 | * | 7/2022 | Cier | G01C 21/383 |

FOREIGN PATENT DOCUMENTS

| | | |
|---|---|---|
| WO | WO-2018052665 A1 | 3/2018 |
| WO | WO-2021113268 A1 | 6/2021 |

* cited by examiner

*Primary Examiner* — Utpal D Shah
(74) *Attorney, Agent, or Firm* — PERRY + CURRIER INC.

(57) ABSTRACT

An example method includes: rendering, at a client device, a representation of a space, the representation generated from video data and depth data representing the space; receiving a selection of a target point within the representation; retrieving, from the video data, a set of video frames including the target point; receiving a selection of a selected video frame from the set; and defining a virtual data capture point within the representation of the space based on the selected video frame.

18 Claims, 10 Drawing Sheets

SYSTEM AND METHOD FOR DEFINING A VIRTUAL DATA CAPTURE POINT

CROSS-REFERENCE TO RELATED APPLICATIONS

This application is a continuation of copending International Application No. PCT/IB2022/062136, filed Dec. 13, 2022, which is incorporated herein by reference in its entirety, and additionally claims priority from U.S. Provisional Patent Application No. 63/288,834, filed Dec. 13, 2021, which is also incorporated herein by reference in its entirety.

FIELD

The specification relates generally to systems and methods for virtual representations of spaces, and more particularly to a system and method for defining a virtual data capture point in a representation of a space.

BACKGROUND

Virtual representations of spaces, such as 3D models, can be useful to allow remote users to view a space. However, remote users may frequently desire more detailed views, such as high resolution images, to view specific features in greater detail, which may be time-consuming and costly to obtain.

SUMMARY

According to an aspect of the present specification, an example method for defining a virtual data capture point comprises: rendering, at a client device, a representation of a space, the representation generated from video data and depth data representing the space; receiving a selection of a target point within the representation; retrieving, from the video data, a set of video frames including the target point; receiving a selection of a selected video frame from the set; and defining a virtual data capture point within the representation of the space based on the selected video frame.

According to another aspect of the present specification, an example server for defining a virtual data capture point comprises: a memory and a communications interface; and a processor interconnected with the memory and the communications interface, the processor configured to: send, via the communications interface, a representation of a space to a client device, the representation generated from video data and depth data representing the space; receive a selection of a target point within the representation; retrieve, from the video data, a set of video frames including the target point; receive a selection of a selected video frame from the set; and define a virtual data capture point within the representation of the space based on the selected video frame.

An aspect of the specification provides a method including: rendering, at a client device, a representation of a space, the representation generated from video data and depth data representing the space; receiving a selection of a target point within the representation; retrieving, from the video data, a set of video frames including the target point; receiving a selection of a selected video frame from the set; and defining a virtual data capture point within the representation of the space based on the selected video frame.

An aspect of the specification provides a method, further including using the depth data to track the target point in 3D space within the representation.

An aspect of the specification provides a method, further including: selecting a plurality of video frames from the video data to be saved in a database; and wherein the set of video frames is selected from the plurality of video frames based on the target point.

An aspect of the specification provides a method, wherein selecting the plurality of video frames includes: dividing the video data into pools of video frames; and for each pool of video frames, selecting a representative video frame to include in the plurality of video frames based on an image parameter.

An aspect of the specification provides a method, wherein the image parameter includes one or more of: blur, contrast, brightness, resolution, and image geometry.

An aspect of the specification provides a method, wherein each pool of video frames includes a predefined number of consecutive video frames of the video data.

An aspect of the specification provides a method, wherein retrieving the set of video frames includes: identifying video frames from the video data containing the target point; and selecting, for the set, the video frames in which at least one attribute of the target point satisfies a criterion.

An aspect of the specification provides a method, wherein the at least one attribute satisfying the criterion includes one or more of: the target point being within a threshold distance from a source location of the video frame; the target point being within a threshold radius of a center of the video frame; and the target point being unoccluded in the video frame.

An aspect of the specification provides a method, wherein selecting the video frames in which the at least one attribute of the target point satisfies the criterion includes: segmenting objects in the video frame based on the depth data; identifying a target object from the segmented objects, the target object corresponding to the target point; and selecting, for the set, the video frames in which at least one attribute of the target object satisfies an object criterion.

An aspect of the specification provides a method, further including applying an image processing technique to each video frame in the set of video frames to enhance the video frame.

An aspect of the specification provides a method, wherein the image processing technique includes one or more of: edge enhancement, contrast enhancement, brightness enhancement, and super-resolution.

An aspect of the specification provides a method, further including rendering, at the client device, the representation including an indicator of the virtual data capture point.

An aspect of the specification provides a method, further including: receiving an additional data capture request defining a subspace within the space for which additional data is to be captured; transmitting the additional data capture request to a data capture device to capture the additional data; and in response to receiving the additional data from the data capture device, updating the representation of the space.

An aspect of the specification provides a method, further including displaying, at the data capture device, a guide as an overlay to a current data capture view of the data capture device, wherein the guide indicates, in the current data capture view, the subspace defined by the additional data capture request.

An aspect of the specification provides a server including: a memory and a communications interface; and a processor interconnected with the memory and the communications interface, the processor configured to: send, via the communications interface, a representation of a space to a client device, the representation generated from video data and depth data representing the space; receive a selection of a target point within the representation; retrieve, from the video data, a set of video frames including the target point; receive a selection of a selected video frame from the set; and define a virtual data capture point within the representation of the space based on the selected video frame.

An aspect of the specification provides a server, wherein the processor is further configured to use the depth data to track the target point in 3D space within the representation.

An aspect of the specification provides a server, wherein the processor is further configured to: select a plurality of video frames from the video data to be saved in a database; and wherein the set of video frames is selected from the plurality of video frames based on the target point.

An aspect of the specification provides a server, wherein, to select the plurality of video frames, the processor is configured to: divide the video data into pools of video frames; and for each pool of video frames, select a representative video frame to include in the plurality of video frames based on an image parameter.

An aspect of the specification provides a server, wherein the image parameter includes one or more of: blur, contrast, brightness, resolution, and image geometry.

An aspect of the specification provides a server, wherein each pool of video frames includes a predefined number of consecutive video frames of the video data.

An aspect of the specification provides a server, wherein, to retrieve the set of video frames, the processor is configured to: identify video frames from the video data containing the target point; and select, for the set, the video frames in which at least one attribute of the target point satisfies a criterion.

An aspect of the specification provides a server, wherein the at least one attribute satisfying the criterion includes one or more of: the target point being within a threshold distance from a source location of the video frame; the target point being within a threshold radius of a center of the video frame; and the target point being unoccluded in the video frame.

An aspect of the specification provides a server, wherein, to select the video frames in which the at least one attribute satisfies the criterion, the processor is configured to: segment objects in the video frame based on the depth data; identify a target object from the segmented objects, the target object corresponding to the target point; and select, for the set, the video frames in which at least one attribute of the target object satisfies an object criterion.

An aspect of the specification provides a server, wherein the processor is further configured to apply an image processing technique to each video frame in the set of video frames to enhance the video frame.

An aspect of the specification provides a server, wherein the image processing technique includes one or more of: edge enhancement, contrast enhancement, brightness enhancement, and super-resolution.

An aspect of the specification provides a server, wherein the processor is further configured to: receive an additional data capture request defining a subspace within the space for which additional data is to be captured; transmit the additional data capture request to a data capture device to capture the additional data; and in response to receiving the additional data from the data capture device, update the representation of the space.

BRIEF DESCRIPTION OF DRAWINGS

Implementations are described with reference to the following figures, in which.

DETAILED DESCRIPTION

In order to provide remote users with detailed views, virtual representations of spaces may include data capture points which have associated high-resolution images that the remote users can view. Thus, the remote users can readily understand the context and layout of the space using the representation, while also having access to detailed high-resolution images of particular features. However, targeted image captures may be time-consuming and difficult to obtain.

Accordingly, an example system in accordance with the present specification utilizes the video data and depth data which were used to generate the representation to extract video frames and define virtual data capture points. Virtual data capture points can therefore be requested and defined dynamically and in real-time based on pre-stored video data.

Figure 1:
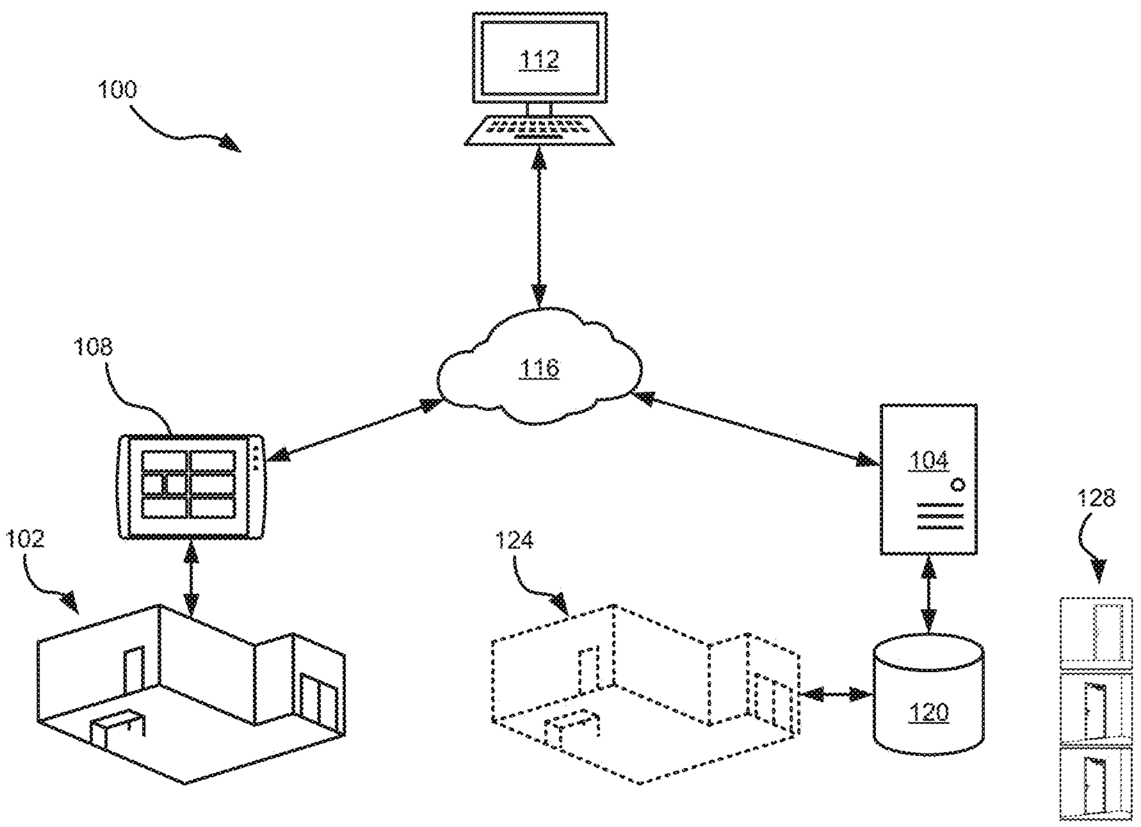
FIG. 1 depicts a block diagram of an example system for defining virtual data capture points.

FIG. 1 depicts a block diagram of an example system 100 for defining virtual data capture points for a space 102. For example, scene or space 102 can be a factory or other industrial facility, an office, a new building, a private residence, or the like, or a scene including any real-world location or object, such as a construction site, a vehicle such as a car or truck, equipment, or the like. It will be understood that space 102 as used herein may refer to any such scene, object, target, or the like. System 100 includes a server 104 and a client device 112 which are preferably in communication via a network 116. System 100 can additional include a data capture device 108 which can additionally be in communication with at least server 104 via network 116.

Server 104 is generally configured to define virtual data capture points within a representation of space 102. Server 104 can be any suitable server or computing environment, including a cloud-based server, a series of cooperating servers, and the like. For example, server 104 can be a personal computer running a Linux operating system, an instance of a Microsoft Azure virtual machine, etc. In particular, server 104 includes a processor and a memory storing machine-readable instructions which, when executed, cause server 104 to define virtual data capture points, as described herein. Server 104 can also include a suitable communications interface (e.g., including transmitters, receivers, network interface devices and the like) to communicate with other computing devices, such as client device 112 via network 116.

Data capture device 108 is a device capable of capturing relevant data such as visual data, depth data, audio data, other sensor data, combinations of the above and the like to allow for the remote inspection of space 102. Data capture device 108 can therefore include components capable of capturing said data, such as one or more imaging devices (e.g., optical cameras), distancing devices (e.g., LIDAR devices or multiple cameras which cooperate to allow for stereoscopic imaging), microphones, and the like. For example, data capture device 108 can be an IPad Pro, manufactured by Apple, which includes a LIDAR system and cameras, a head-mounted augmented reality system, such as a Microsoft Hololens™, a camera-equipped hand-held device such as a smartphone or tablet, a computing device with interconnected imaging and distancing devices (e.g., an optical camera and a LIDAR device), or the like. Data capture device 108 can implement simultaneous localization and mapping (SLAM), 3D reconstruction methods, photogrammetry, and the like. The actual configuration of data capture device 108 is not particularly limited, and a variety of other possible configurations will be apparent to those of skill in the art in view of the discussion below.

Data capture device 108 additionally includes a processor, and non-transitory machine-readable storage medium, such as a memory, which can cause data capture device 108 to perform the data capture operation described above. Data capture device 108 can also include a display, such as an LCD (liquid crystal display), an LED (light-emitting diode) display, a heads-up display, or the like to present a user with visual indicators to facilitate the data capture operation. Data capture device 108 also includes a suitable communications interface to communicate with other computing devices, such as server 104 via network 116.

Client device 112 is generally configured to present a representation of space 102 to a user, and allow the user to interact with the representation, including providing input for the definition of the virtual data capture points, as described herein. Client device 112 can be a computing device, such a laptop computer, a desktop computer, a tablet, a mobile phone, a kiosk, or the like. Client device 112 includes a processor and a memory, as well as a suitable communications interface to communicate with other computing devices, such as server 104 via network 116. Client device 112 further includes one or more output devices, such as a display, a speaker, and the like, as well as one or more input devices, such as a keyboard, a mouse, a touch-sensitive display, and the like.

Network 116 can be any suitable network including wired or wireless networks, including wide-area networks, such as the Internet, mobile networks, local area networks employing routers, switches, wireless access points, combinations of the above, and the like.

System 100 further includes a database 120 associated with server 104. For example, database 120 can be one or more instances of My SQL or any other suitable database. Database 120 is configured to store data to be used to define the virtual capture points. In particular, database 120 is configured to store a representation 124 of space 102, and a plurality of video frames 128 of space 102.

Figure 2:
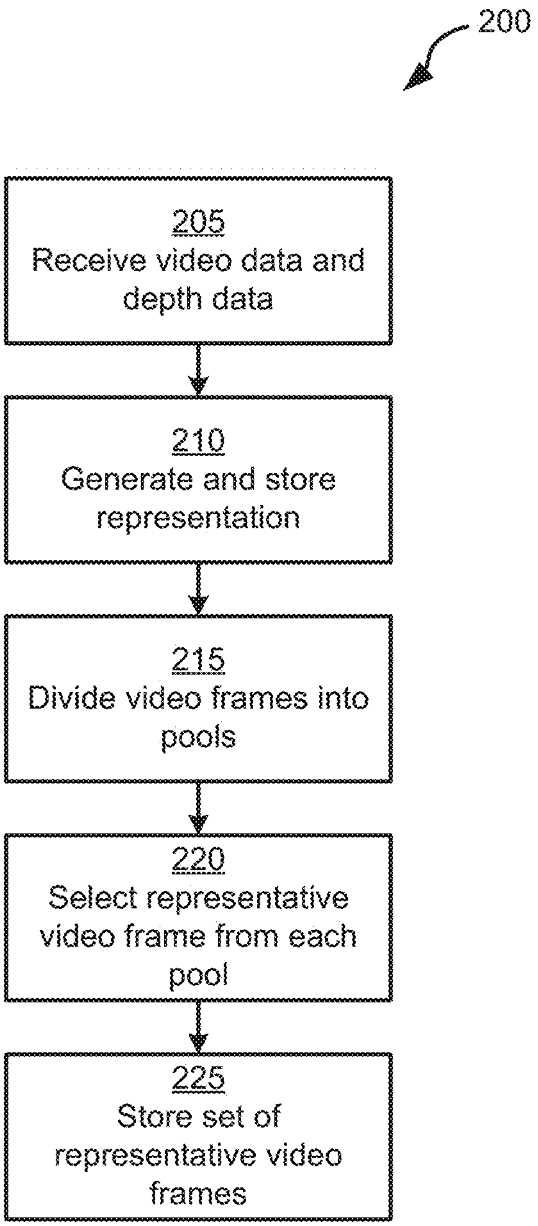
FIG. 2 depicts a flowchart of an example method of obtaining and storing video data and depth data to define virtual data capture points.

Referring to FIG. 2, an example method 200 of retrieving data to be stored in database 120 is depicted. Method 200 is described in conjunction with its performance by server 104, however in other examples, method 200 can be performed by other suitable devices or systems.

At block 205, server 104 receives video data and depth data representing space 102. For example, a user can walk around space 102 with data capture device 108 to capture the video data and depth data representing space 102. For example, data capture device 108 can utilize a LIDAR device, stereoscopic imaging, and the like to create a point cloud representing space 102, as well as an imaging device (e.g., a camera) to capture the video data. In other examples, the depth data can be inferred using the video data. Additionally, since data capture device 108 can be used to simultaneously capture the video data and the depth data, the video data and depth data can be correlated so that the video data can be mapped to the point cloud generated by the depth data, including a correspondence to a location of data capture device 108 during the capture of each video frame in the video data. Data capture device 108 can then send the video data and point cloud/depth data to server 104. Server 104 can store the raw video data and depth data, or server 104 can apply some pre-processing to the video data and depth data prior to storing it in database 120.

In some examples, the video data, depth data, and any other data representing space 102 may be compressed and sent to server 104, while in other examples, the data capture by data capture device 108 may be streamed to server 104.

At block 210, server 104 generates and stores a representation (e.g., the representation 124) of space 102 using the video data and depth data received at block 205. For example, server 104 can use the point cloud to generate a 3D model, and use the video data to texturize the 3D model. The representation 124 is then stored at database 120. In other examples, server 104 may simply receive and store the representation from data capture device 108 which generates the representation.

Server 104 can also save video frames from the video data for future processing and reference. However, saving each video frame of the video data can consume a considerable amount of space, and can increase processing time for subsequent operations which scan the video frames, hence it can be preferable to save a subset of the video frames from the video data.

Accordingly, at block 215, server 104 can divide the video frames of the video data into a plurality of pools of video frames. Each pool of video frames can include a subset of all the video frames in the video data. For example, each pool of video frames can include a predefined number of frames (e.g., 5 frames, 10 frames, 20 frames, etc.). In particular, each pool can include the predefined number of consecutive video frames to increase the likelihood that the frames in the pool will have similar content, including the objects captured and the relative spatial locations of the objects. In other examples, each pool can contain different numbers of frames, or the frames in each pool can be divided out in a different manner (e.g., based on image processing techniques to classify similar frames into the same pool, based on context determined from the 3D position and camera intrinsic data, etc.).

At block 220, server 104 selects a representative video frame from each pool. The representative video frame can be based on an image parameter, such as blur, contrast, brightness, resolution, and the like. For example, server 104 can select as the representative video frame, the least blurry video frame, the brightest video frame, the video frame having its brightness closest to a target brightness level, the video frame with the highest resolution or highest contrast, and the like. In other examples, server 104 can select the representative video frame based on the image geometry of the video frame and/or objects within the video frame, occlusions, object detection, feature points, and the like. Other image parameters for selecting a representative video frame will also occur to those of skill in the art. In some examples, server 104 can select multiple representative frames to be saved to database 120. For example, each representative frame can correspond to a predefined parameter, so that a best representative frame may be used according to the predefined parameter to be used.

As will now occur to those of skill in the art, in other examples, other manners of selecting representative frames from the video data. For example, server 104 can select frames based on a speed of data capture device 108 (e.g., as derived from the distance between positions of objects in the depth data) or use other suitable image and spatial data analysis to process the video data.

At block 225, server 104 stores the set of representative video frames selected at block 220 in database 120. For example, video frames 128 can each be a representative video frame selected from a pool of video frames from video data captured by data capture device 108. Video frames 128 can then subsequently be used during the definition of virtual data capture points, as described herein. In some examples, some processing of the video frames, such as facial blurring and other security constraints, can be performed by server 104 prior to storing the representative video frames.

System 100 is generally configured to define virtual data capture points in a representation 124 of space 102. Representation 124 can be presented, for example at client device 112 to allow an inspector to inspect space 102, or to otherwise allow a user of client device 112 to view space 102.

Further, to view certain areas of space 102 in greater detail, representation 124 can include data capture points. The data capture points represent locations in space 102 at which additional data can be presented, for example in the form of image data, audio data, and the like. The data capture points can be points at which the additional data was actively captured, for example by capturing the data using device 108. Alternately, the data capture points can be virtual data capture points, at which the additional data was extracted and associated with the location by the server 104, as described in further detail herein. For example, the virtual data capture points can associate one of video frames 128 with the location at which it was captured. Selected video frame 128 can provide more detail and clearer image data than representation 124 for viewing by a user at client device 112. Advantageously, by extracting video frame 128 from the video data used to generate representation 124, the virtual data capture point can be generated in near real-time, and without requiring a user to return to space 102 and capture the requested data with data capture device 108.

Figure 3:
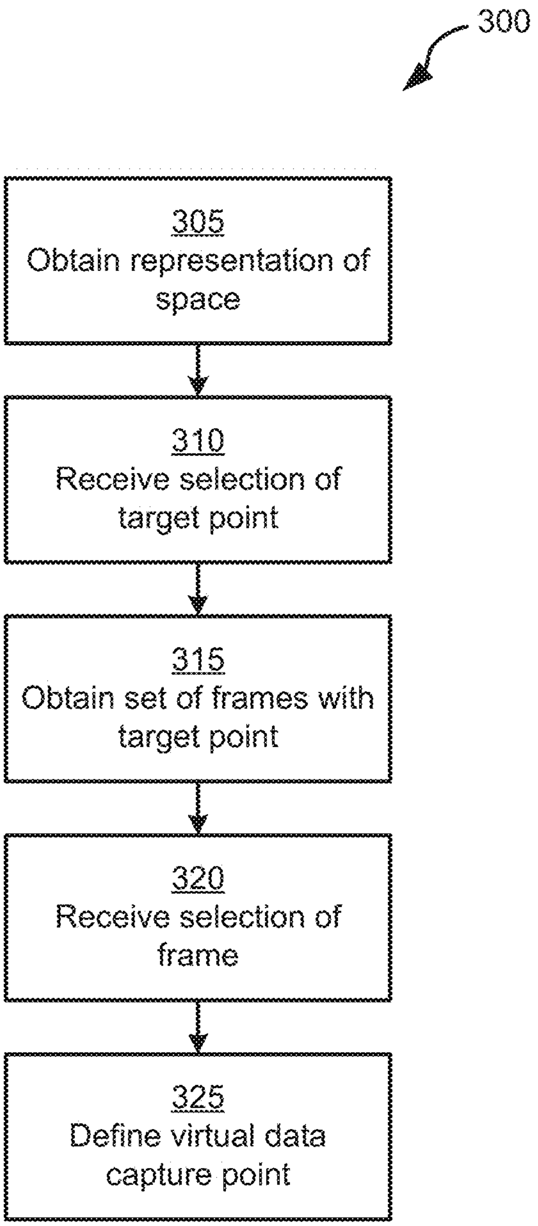
FIG. 3 depicts a flowchart of an example method for defining virtual data capture points.

Turning now to FIG. 3, a flowchart of a method 200 of defining a virtual data capture point is depicted. Method 300 will be described in conjunction with its performance in system 100. In other examples, method 300 can be performed in other suitable systems. In some examples, the blocks of method 300 can be performed concurrently and/or in an order different from that depicted, and accordingly are referred to as blocks and not steps.

At block 305, server 104 obtains representation 124 of space 102 from database 120. For example, in response to a request from client device 112, server 104 can send representation 124 to client device 112 to be rendered at a display of client device 112. For example, server 104 can enable client device 112 to render a navigable 3D model of space 102. A user operating client device 112 can navigate about representation 124 using any of a variety of known navigation techniques, including indications of a direction of movement, a rotation, a scaling request, or the like, to change the view of representation 124.

At block 310, server 104 receives a selection of a target point within representation 124. The target point can represent a point, region, object, or the like within the representation for which a more detailed and/or clearer data capture operation is desired. For example, an inspector operating client device 112 may wish to view certain areas (e.g., fire exits) of a space to ensure that they adequately satisfy regulations. Accordingly, the user operating client device 112 can navigate within representation 124 and select the target point within a current field of view of representation 124 on client device 112. The target point can then be transmitted to server 104 as the selected target point.

Figure 4:
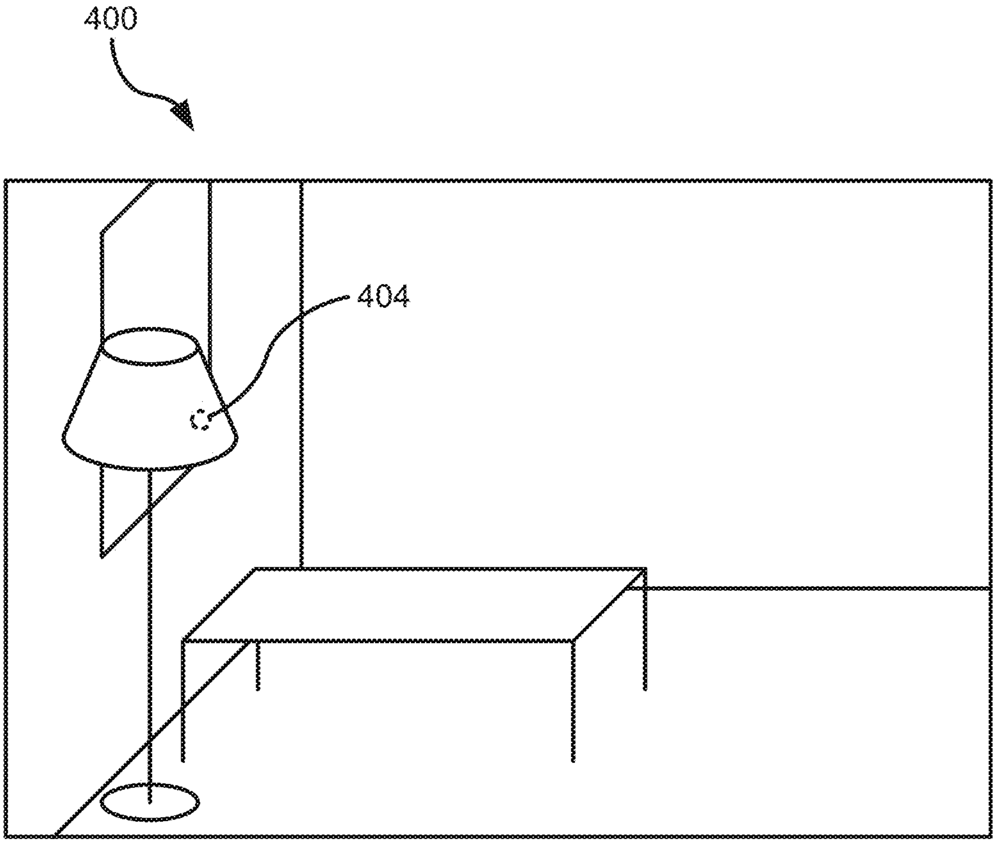
FIG. 4 depicts a schematic view of a performance of block 310 of the method of FIG. 3.

For example, referring to FIG. 4, an example view 400 of representation 124 is depicted. View 400 can be a view presented at client device 112 to the user. The user can select a target point 404, on a lamp within view 400, to indicate that a data capture view including target point 404 is desired.

In order to accurately track target point 404 within the 3D representation 124, server 104 can additionally determine the pose and orientation for view 400, and utilize the depth data used to generate representation 124 to map target point 404 to a nearest surface (i.e., in the present example, the surface of the lamp) in order to track target point 404 in 3D space and other angles and orientations.

Returning to FIG. 3, at block 315, server 104 obtains a set of video frames from the video data which include the target point selected at block 310. In particular, the set of video frames can be selected and filtered from the plurality of video frames 128 saved in database 120.

Figure 5:
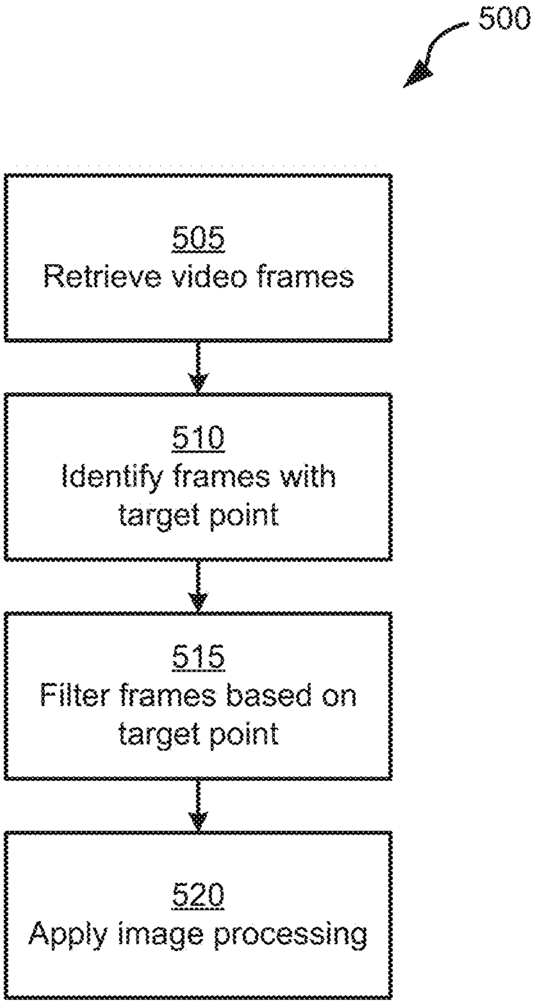
FIG. 5 depicts a flowchart of an example method of obtaining a set of frames at block 315 of the method of FIG. 3.

For example, referring to FIG. 5, an example method 500 of selecting the set of video frames from the video data is depicted.

At block 505, server 104 retrieves a plurality of video frames of the video data used to generate representation 124. For example, the plurality of video frames can be the set of representative video frames 128 stored in database 120.

At block 510, server 104 identifies video frames from the plurality of video frames retrieved at block 505 which contain the target point. For example, server 104 can use the location of the target point in 3D space in representation 124, as well as the correspondence between the video data and the depth data to identify video frames which may have been captured from different angles, distances or orientations, but which may still contain the target point.

At block 515, server 104 filters the frames selected at block 510 based on an attribute of the target point, and in particular, whether at least one attribute of the target point satisfies a criterion. For example, server 104 can filter the frames based on one or more of a distance of the target point, a position of the target point within the video frame, whether or not the target point is occluded in the video frame, an attribute of a target object associated with the target point based on segmentation, or the like. For example, server 104 can select frames in which the target point is within a threshold distance from a source location of the video frame, frames in which the target point is within a threshold radius of a center of the video frame, and/or frames in which the target point is unoccluded by other objects in the video frame.

Server 104 can also use segmentation to map the target point to a target object, and use an attribute of the target object to filter the frames selected at block 510 instead. In particular, server 104 can segment the objects in a given video frame using the depth data, using any suitable segmentation algorithm. After applying segmentation, the video frame can include groups of depth data points, each of which correspond to different objects. For example segmentation can be performed based on the proximity of each of the depth data points to one another, so that points in close proximity are determined to be part of the same object, while points far from one another are determined to be separate objects. Other segmentation methods, including machine learning-based segmentation methods, or any other suitable 2D or 3D segmentation methods are also contemplated.

Figure 6:
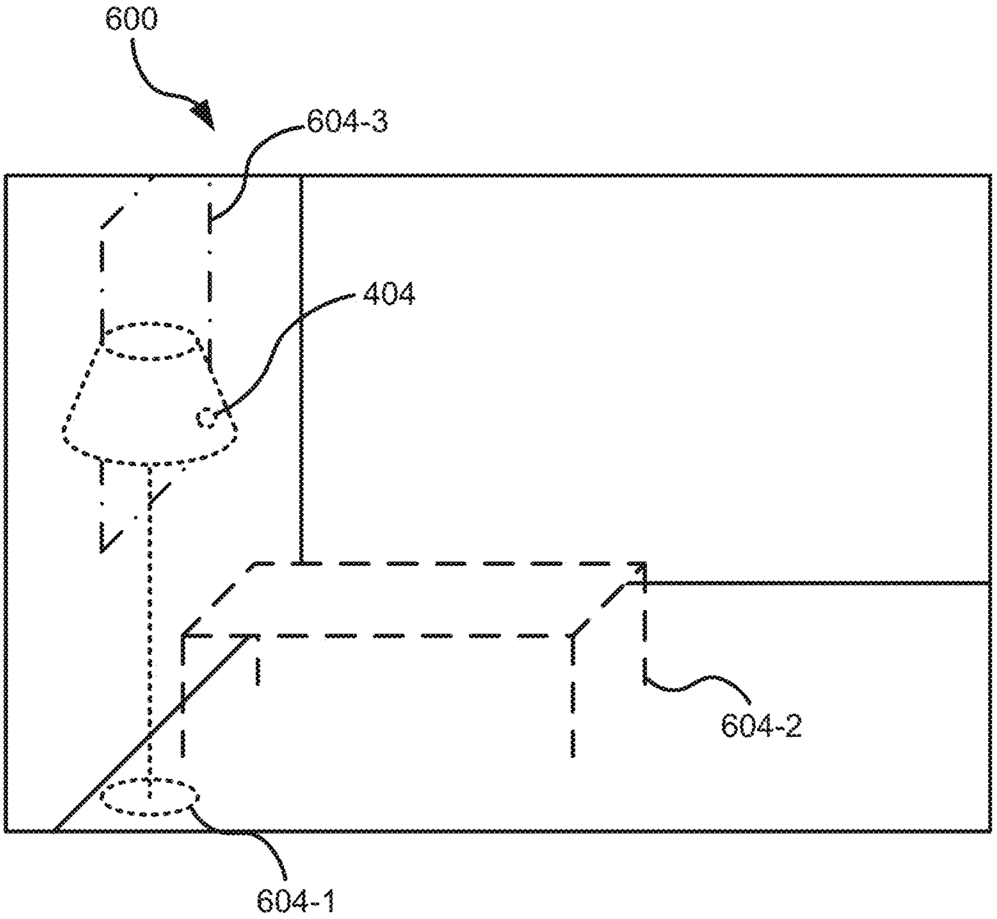
FIG. 6 depicts a schematic view of segmentation at a performance of block 515 of the method of FIG. 5.

For example, FIG. 6 depicts a frame 600 corresponding to the view 400 of FIG. 4 having three segmented objects 604-1, 604-2, and 604-3, representing the lamp, the desk, and the painting (e.g., in the present example, the painting can have a depth to allow it to be segmented from the wall), respectively. Server 104 can then identify a target object from segmented objects 604 based on target point 404. The target object corresponds to the target point—i.e., the target object is the segmented object which includes the target point—and hence in the present example, the target object is lamp 604-1.

Server 104 can then use the target object as a whole to filter the frames based on an attribute of the target object, and in particular, whether at least one attribute of the target object satisfies an object criterion. For example, server 104 can select frames in which the target object is within a threshold distance from a source location of the video frame (e.g., based on an average distance of the points forming the target object), frames in which the target object is within a threshold radius of the center of the frame (e.g., based on a threshold percentage of points of the target object being within the threshold radius), frames in which a threshold percentage of the points forming the target object are unoccluded, or the like. Further attributes and criteria for selecting frames for the set will also be apparent to those of skill in the art.

Returning to FIG. 5, at block 520, server 104 can apply one or more imaging processing techniques to the frames selected for the set at block 515. That is, to improve the appearance of the frames selected at block 515 to be presented to the user, server 104 can apply image processing to each video frame in the set to enhance the video frame. For example, the image processing techniques can include one or more of edge enhancement, contrast enhancement, brightness enhancement, and super-resolution. For example, server 104 can employ one or more artificial intelligence engines employing a trained network to enable super-resolution for a given video frame. In particular, since the video frame is selected from a plurality of video frames, the artificial intelligence engines can be able to interpolate image data from other similar video frames, to be applied to the given video frame to increase its resolution. In still further examples, server 104 can stitch together multiple images to create a panorama or image with a larger field of view, apply facial detection and recognition, optical character recognition, or other suitable image processing techniques as will be apparent to those of skill in the art.

Returning to FIG. 3, after selecting the set of frames to be presented to the user at client device 112, at block 320, server 104 receives a selection of a selected video frame from the set. The selected video frame represents an image which a user determines to be representative of the target point selected at block 310. For example, the server 104 can receive the selected video frame from client device 112 when an inspector operating client device 112 selects a video frame which displays an area to be inspected.

Figure 7:
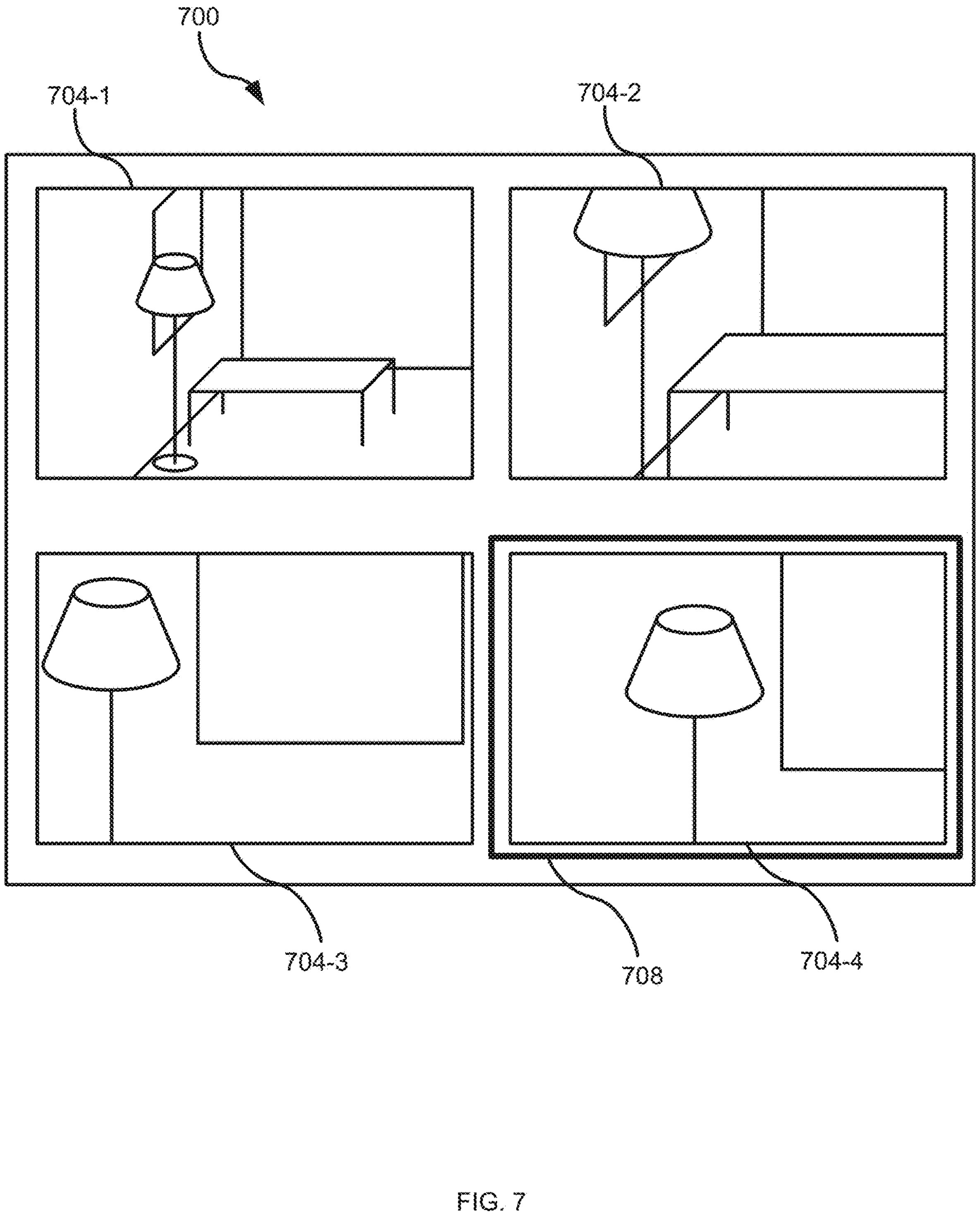
FIG. 7 depicts a schematic view of a performance of block 320 of the method of FIG. 3.

Referring to FIG. 7, an example view 700 of a set of video frames, 704-1, 704-2, 704-3, and 704-4 is depicted. View 700 can be presented at client device 112 to the user. In particular, each of the video frames 704 includes target point 404 on the lamp, but can depict target point 404 at different distances, positions within the frame, and the like. Frames 704 can be sorted within view 700, for example based on the measures used to select the set of video frames, such as the position of target point 404 within the frame, the distance to target point 404, a user selected parameter, or other suitable parameter.

In other examples, some of the frames 704 can be filtered out based on an attribute of the target point during the performance of method 500. In one example, frame 704-1 can be filtered out because target point 404 is further than a threshold distance away from the source location of frame 704-1 (i.e., the location of data capture device 108 during capture of frame 704-1). In another example, frame 704-2 can be filtered out because the target object (i.e., the lamp) as identified after segmenting and mapping the target point, is not entirely contained within frame 704-2. In a further example, frame 704-3 can be filtered out because target point 404 is positioned outside of a threshold radius from a center of frame 704-3.

In the present example, all of frames 704 can be presented at client device 112 to the user. The user can make a selection 708 of video frame 704-4 as the selected video frame. The selection 708 of frame 704-4 as the selected video frame can then be transmitted to server 104.

Returning to FIG. 3, at block 325, server 104 defines a virtual capture point based on the selected video frame identified at block 320. To define the virtual capture point, server 104 identifies the location of data capture device 108 when the selected video frame was captured. Server 104 then saves the location in representation 124 as a virtual data capture point. Server 104 additionally associates the selected video frame with the virtual data capture point. In some examples, server 104 can apply additional image processing techniques to further enhance the selected video frame associated with the virtual data capture point. For example, server 104 may apply edge enhancement, facial detection, optical character recognition, super-resolution and the like. Subsequently, representation 124 can additionally display the newly defined virtual data capture point when it is rendered at client device 112.

Figure 8:
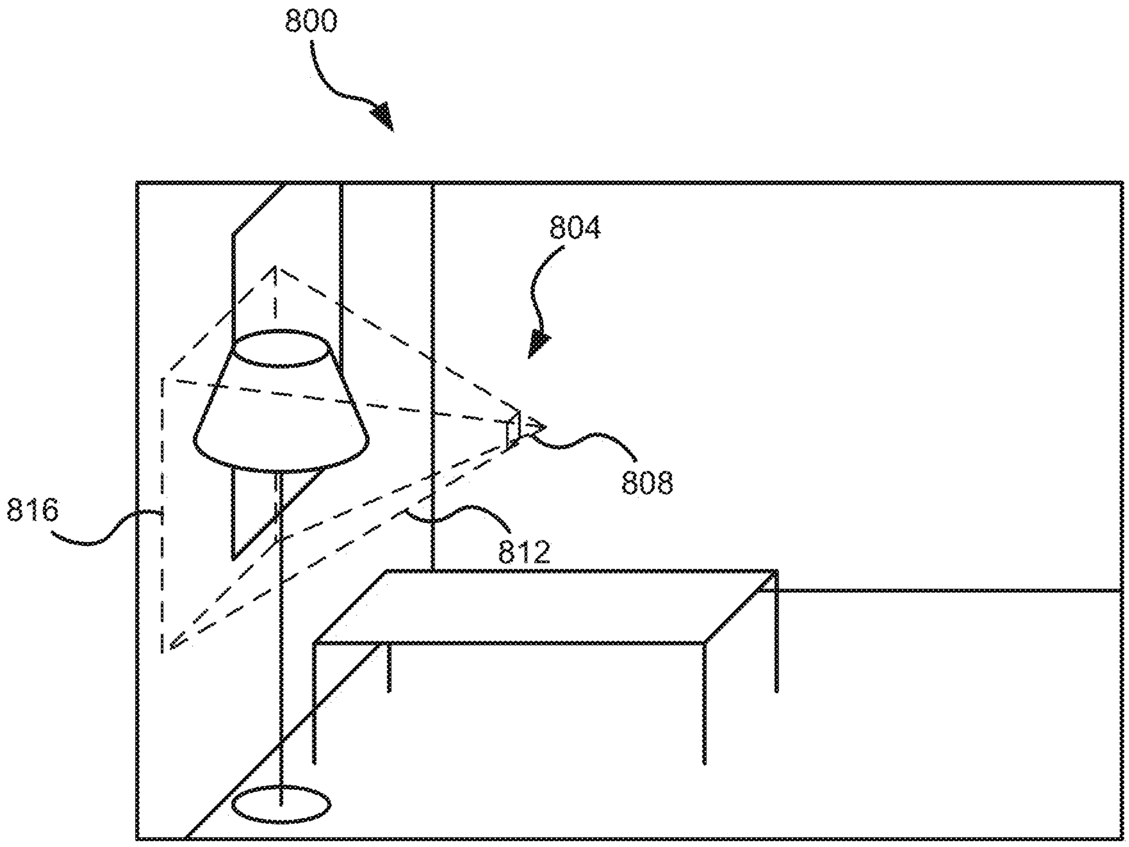
FIG. 8 depicts a schematic view of a performance of block 325 of the method of FIG. 3.

For example, referring to FIG. 8, an example view 800 of representation 124 is depicted. View 800 can be presented at client device 112 to the user. As can be seen in view 800, representation 124 is updated to include an indicator of a virtual data capture point 804. Virtual data capture point 804 is indicated by a frustum 808 representing the location of the virtual data capture point 804 and the location of data capture device 108 when the corresponding video frame was captured. Virtual data capture point 804 can further be indicated by a pyramid 812 extending from frustum 808 and terminating at base 816, representing the plane of the video frame.

Figure 9:
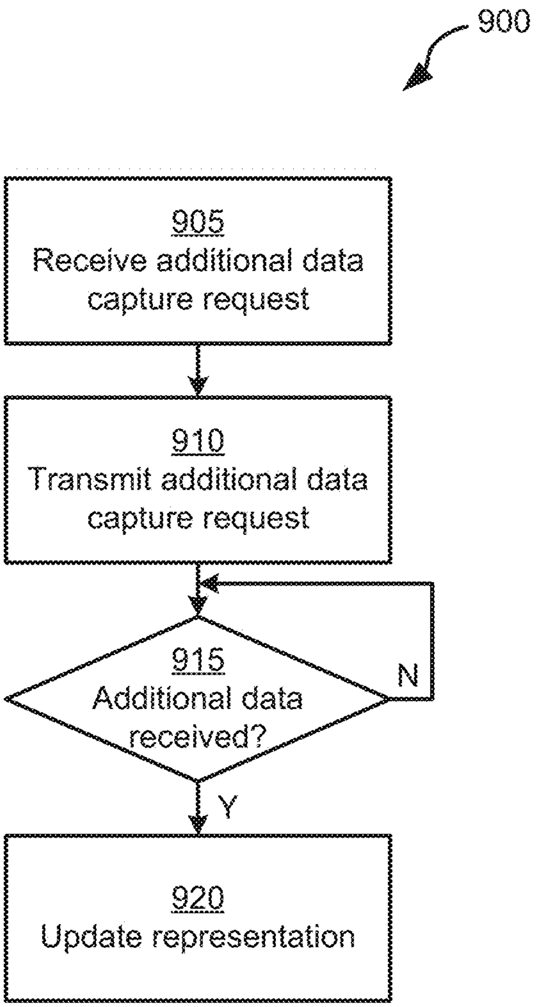
FIG. 9 depicts a flowchart of an example method of processing an additional data capture request.

In some examples, the user at client device 112 may desire additional data capture points and/or views than may be available based on the video frames captured to generate the representation. Accordingly, system 100 may additionally enable additional data capture requests. FIG. 9 depicts an example method 900 of fulfilling such an additional data capture request.

At block 905, server 104 receives an additional data capture request, for example from client device 112. For example, if after reviewing the set of frames obtained at block 315 of method 300, the user determines that none of the frames is suitable from which to define a virtual data capture point, the user may then submit an additional data capture request (e.g., via client device 112). In other examples, the additional data capture request may originate from other source devices and/or for other reasons.

In particular, the additional data capture request may specify a subspace of space 102 for which additional data is to be captured. For example, the user of client device 112 may specify a central point (e.g., the target point selected at block 310) about which to capture the additional data, and the subspace may be automatically defined for the additional data capture request based on a bounding box of a predefined size about the central point, or similar. In other examples, the user of client device 112 may specifically define a bounding box or other region defining the subspace for which additional data is to be captured.

At block 910, server 104 transmits the additional data capture request to data capture device 108 or another suitable data capture device to capture the additional data. In some examples, server 104 may additionally push or otherwise generate a notification or alert for the user of data capture device 108 to capture the additional data.

Data capture device 108 may be configured to facilitate capture of the additional data. In particular, data capture device 108 may be configured to locate itself within space 102 (e.g., by comparison of captured image, video, depth data, or the like to the representation 124, comparing spatial feature points and delocalization using SLAM, or other suitable methods of determining its location within space 102). Accordingly, upon receiving the additional data capture request, data capture device 108 may determine a location of the subspace defined by the additional capture request relative to itself. More specifically, data capture device 108 may determine whether any part of the subspace is within a current data capture view of data capture device 108. If any part of the subspace is within the current data capture view, data capture device 108 may be configured to render or display a guide as an overlay to the current data capture view. The guide may be configured to indicate, in the current data capture view, the subspace defined by the additional data capture request. The guide may be a bounding box around the space, and may be displayed in suitable colors, textures, or the like to indicate to a user that additional data is to be captured for the indicated region.

Figure 10:
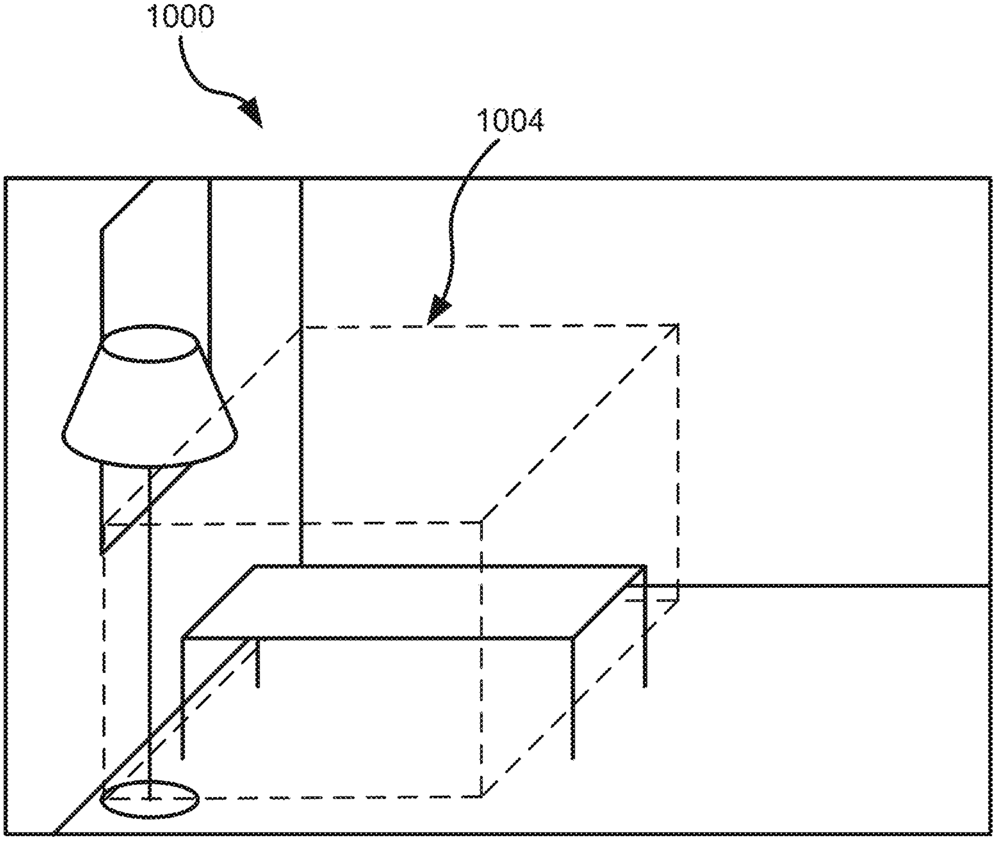
FIG. 10 depicts a schematic view of a current data capture view with an overlaid guide for an additional data capture request.

For example, FIG. 10 depicts an example current data capture view 1000 with a guide 1004 overlayed depicting a subspace for which additional data is to be captured. The user may walk around space 102 with data capture device 108 to capture video data and depth data representing space 102. This process may be similar to the data capture process to obtain video data and depth data at block 205 of method 200. That is, the captured data (e.g., video data, depth data, spatial coordinates, annotations, etc.) satisfying the additional data capture request may be compressed and sent to server 104 by data capture device 108 or data capture device 108 may stream the data capture operation to server 104.

Returning to FIG. 9, at block 915, server 104 determines whether the additional data satisfying the additional data capture request has been received. If the determination is negative, server 104 may continue to wait for the additional data. If the determination is affirmative, server 104 proceeds to block 920.

At block 920, server 104 updates representation 124, for example by returning to block 210 of method 200. Preferably, the additional data capture may supplement the data used to generate the representation (e.g., by adding to the set of representative video frames for a given area or region of space 102). Accordingly, on a subsequent performance of block 315, server 104 may obtain a larger set of frames with the target point (i.e., a larger number of frames may contain the target point), thereby increasing the likelihood that the user of client device 112 may identify a suitable frame for defining a virtual capture point.

Allowing for targeted additional capture requests defining subspaces of space 102 may reduce the computational burden on server 104 to process and store additional data representing the entirety of space 102 (i.e., equating to multiple overlaid copies of representation 124). Further, the targeted additional capture requests reduce the burden on data capture device 108 and improves the user experience, since only a portion of space 102 requires additional data capture.

As described above, a system and method for representing a space and allowing for dynamic definition of virtual data capture points to provide additional detail about the space is provided. The system stores video data and depth data used to generate a representation of a space, and can subsequently extract data (i.e., video frames) from said video data to allow virtual data capture points to be defined. The virtual data capture points represent locations at which a more detailed image view is available for a user to peruse. Advantageously the data capture points are virtually defined, and the detailed image view is virtually extracted from existing stored video data to reduce the lag between requesting a data capture point and acquiring a high-resolution still image for the data capture point.

The scope of the claims should not be limited by the embodiments set forth in the above examples but should be given the broadest interpretation consistent with the description as a whole.

The invention claimed is:

1. A method comprising:

rendering, at a client device, a representation of a space, the representation generated from video data and depth data representing the space;

receiving a selection of a target point within the representation;

retrieving, from the video data, a set of video frames including the target point, the retrieving comprising:

identifying video frames from the video data containing the target point; and selecting, for the set, the video frames in which at least one attribute of the target point satisfies a criterion, wherein the at least one attribute satisfying the criterion comprises one or more of:

the target point being within a threshold distance from a source location of the video frame;

the target point being within a threshold radius of a center of the video frame; and the target point being unoccluded in the video frame;

receiving a selection of a selected video frame from the set; and defining a virtual data capture point within the representation of the space based on the selected video frame.

2. The method of claim 1, further comprising using the depth data to track the target point in 3D space within the representation.

3. The method of claim 1, further comprising:

selecting a plurality of video frames from the video data to be saved in a database; and wherein the set of video frames is selected from the plurality of video frames based on the target point.

4. The method of claim 3, wherein selecting the plurality of video frames comprises:

dividing the video data into pools of video frames; and for each pool of video frames, selecting a representative video frame to include in the plurality of video frames based on an image parameter.

5. The method of claim 4, wherein the image parameter comprises one or more of:

blur, contrast, brightness, resolution, and image geometry.

6. The method of claim 4, wherein each pool of video frames comprises a predefined number of consecutive video frames of the video data.

7. The method of claim 1, further comprising applying an image processing technique to each video frame in the set of video frames to enhance the video frame.

8. The method of claim 7, wherein the image processing technique comprises one or more of: edge enhancement, contrast enhancement, brightness enhancement, and super-resolution.

9. The method of claim 1, further comprising rendering, at the client device, the representation including an indicator of the virtual data capture point.

10. The method of claim 1, further comprising:

receiving an additional data capture request defining a subspace within the space for which additional data is to be captured;

transmitting the additional data capture request to a data capture device to capture the additional data; and in response to receiving the additional data from the data capture device, updating the representation of the space.

11. The method of claim 10, further comprising displaying, at the data capture device, a guide as an overlay to a current data capture view of the data capture device, wherein the guide indicates, in the current data capture view, the subspace defined by the additional data capture request.

12. A server comprising:

a memory and a communications interface; and a processor interconnected with the memory and the communications interface, the processor configured to:

send, via the communications interface, a representation of a space to a client device, the representation generated from video data and depth data representing the space;

receive a selection of a target point within the representation;

retrieve, from the video data, a set of video frames including the target point, the retrieving comprising:

identifying, by the processor, video frames from the video data containing the target point; and selecting, by the processor, for the set, the video frames in which at least one attribute of the target point satisfies a criterion, wherein the at least one attribute satisfying the criterion comprises one or more of:

the target point being within a threshold distance from a source location of the video frame;

the target point being within a threshold radius of a center of the video frame; and the target point being unoccluded in the video frame;

receive a selection of a selected video frame from the set; and define a virtual data capture point within the representation of the space based on the selected video frame.

13. The server of claim 12, wherein the processor is further configured to use the depth data to track the target point in 3D space within the representation.

14. The server of claim 12, wherein the processor is further configured to:

select a plurality of video frames from the video data to be saved in a database; and wherein the set of video frames is selected from the plurality of video frames based on the target point.

15. The server of claim 14, wherein, to select the plurality of video frames, the processor is configured to:

divide the video data into pools of video frames; and for each pool of video frames, select a representative video frame to include in the plurality of video frames based on an image parameter.

16. The server of claim 15, wherein the image parameter comprises one or more of: blur, contrast, brightness, resolution, and image geometry.

17. The server of claim 15, wherein each pool of video frames comprises a predefined number of consecutive video frames of the video data.

18. A method comprising:

rendering, at a client device, a representation of a space, the representation generated from video data and depth data representing the space;

receiving a selection of a target point within the representation;

retrieving, from the video data, a set of video frames including the target point, the retrieving comprising:

identifying video frames from the video data containing the target point; and selecting, for the set, the video frames in which at least one attribute of the target point satisfies a criterion, the selecting comprising:

segmenting objects in the video frame based on the depth data;

identifying a target object from the segmented objects, the target object corresponding to the target point; and selecting, for the set, the video frames in which at least one attribute of the target object satisfies an object criterion, receiving a selection of a selected video frame from the set; and defining a virtual data capture point within the representation of the space based on the selected video frame.

* * * * *